United States Patent
Ayres et al.

(10) Patent No.: US 11,747,535 B2
(45) Date of Patent: Sep. 5, 2023

(54) SKEW ILLUMINATOR

(71) Applicant: Akonia Holographics LLC, Longmont, CO (US)

(72) Inventors: Mark R. Ayres, Boulder, CO (US); Adam Urness, Louisville, CO (US); Kenneth E. Anderson, Longmont, CO (US); Chris Berliner, Westminster, CO (US)

(73) Assignee: Akonia Holographics LLC, Longmont, CO (US)

( * ) Notice: Subject to any disclaimer, the term of this patent is extended or adjusted under 35 U.S.C. 154(b) by 326 days.

(21) Appl. No.: 16/484,799

(22) PCT Filed: Feb. 15, 2018

(86) PCT No.: PCT/US2018/018384
§ 371 (c)(1),
(2) Date: Aug. 8, 2019

(87) PCT Pub. No.: WO2018/152336
PCT Pub. Date: Aug. 23, 2018

(65) Prior Publication Data
US 2019/0361163 A1    Nov. 28, 2019

Related U.S. Application Data

(60) Provisional application No. 62/459,553, filed on Feb. 15, 2017.

(51) Int. Cl.
*G02B 5/32* (2006.01)
*G02B 27/10* (2006.01)
*G03H 1/04* (2006.01)

(52) U.S. Cl.
CPC .............. *G02B 5/32* (2013.01); *G02B 27/10* (2013.01); *G03H 1/041* (2013.01)

(58) Field of Classification Search
CPC ........ G02B 5/32; G02B 27/10; G02B 27/283; G02B 27/00; G03H 1/041
(Continued)

(56) References Cited

U.S. PATENT DOCUMENTS

| 5,615,024 A | 3/1997 | May et al. |
| 6,275,623 B1 | 8/2001 | Brophy et al. |

(Continued)

FOREIGN PATENT DOCUMENTS

| CN | 1430074 A | 7/2003 |
| CN | 1559000 A | 12/2004 |

(Continued)

OTHER PUBLICATIONS

International Search Report for PCT application No. PCT/US2018/018384 dated Jun. 8, 2019.

*Primary Examiner* — Jade R Chwasz
(74) *Attorney, Agent, or Firm* — Michael H. Lyons

(57) ABSTRACT

A skew mirror is an optical reflective device, such as a volume holographic optical element, whose reflective axis forms an angle (the skew angle) with the surface normal. A skew illuminator is a skew mirror that expands a narrow beam into a wide beam without changing the angular bandwidth of the illumination. Because the skew angle can form a relatively large angle with the surface normal (e.g., about 45), a skew illuminator can be fairly compact, making it suitable for directing light onto a spatial light modulator (SLM) in a small package. In some cases, the skew illuminator is formed as a waveguide, with a holographic layer sandwiched between a pair of substrates. A grating structure in the holographic core diffracts light out of the waveguide and, e.g., onto the active area of an SLM, which modulates the incident light and either transmits it or reflects it back through the waveguided skew illuminator.

19 Claims, 13 Drawing Sheets

(58) Field of Classification Search
USPC .......................................................... 359/28
See application file for complete search history.

(56) References Cited

U.S. PATENT DOCUMENTS

| | | | |
|---|---|---|---|
| 6,434,291 | B1 | 8/2002 | Kessler et al. |
| 6,750,996 | B2 * | 6/2004 | Jagt ...................... G03H 1/0408 359/34 |
| 7,070,293 | B2 | 7/2006 | Seymour et al. |
| 7,130,120 | B2 * | 10/2006 | Katsumata ........... G02B 27/283 359/485.04 |
| 7,418,170 | B2 | 8/2008 | Mukawa et al. |
| 7,502,168 | B2 | 3/2009 | Akutsu et al. |
| 7,764,413 | B2 | 7/2010 | Levola |
| 8,160,411 | B2 | 4/2012 | Levola et al. |
| 8,233,204 | B1 | 7/2012 | Robbins et al. |
| 8,446,675 | B1 | 5/2013 | Wang et al. |
| 8,665,178 | B1 | 3/2014 | Wang |
| 8,903,207 | B1 | 12/2014 | Brown et al. |
| 9,075,184 | B2 | 7/2015 | Popovich et al. |
| 9,341,846 | B2 | 5/2016 | Popovich et al. |
| 9,456,744 | B2 | 10/2016 | Popovich et al. |
| 2004/0008401 | A1 | 1/2004 | Szczepanek et al. |
| 2006/0018112 | A1 | 1/2006 | Seymour |
| 2007/0268536 | A1 | 11/2007 | Holmes et al. |
| 2010/0238529 | A1 * | 9/2010 | Sampsell ............. G03H 1/0408 359/15 |
| 2012/0092735 | A1 | 4/2012 | Futterer et al. |
| 2012/0257168 | A1 | 10/2012 | Ishimatsu |
| 2013/0160850 | A1 | 6/2013 | Aspnes et al. |
| 2013/0250430 | A1 | 9/2013 | Robbins et al. |
| 2014/0022615 | A1 | 1/2014 | Clemens et al. |
| 2014/0140654 | A1 * | 5/2014 | Brown ................ G02B 27/0172 385/10 |
| 2015/0378080 | A1 * | 12/2015 | Georgiou ................. G02B 5/32 349/62 |
| 2016/0154150 | A1 | 6/2016 | Simmonds et al. |
| 2017/0031160 | A1 | 2/2017 | Popovich et al. |
| 2017/0276940 | A1 | 9/2017 | Popovich et al. |
| 2019/0094981 | A1 | 3/2019 | Bradski et al. |

FOREIGN PATENT DOCUMENTS

| | | |
|---|---|---|
| CN | 101040201 A | 9/2007 |
| CN | 106443867 A | 2/2017 |
| DE | 19818229 A1 | 10/1999 |
| DE | 60001647 T2 | 4/2004 |
| EP | 1179200 | 3/2003 |
| JP | H11-232919 A | 8/1999 |
| JP | 2002-062507 A | 2/2002 |
| JP | 2002-131551 A | 5/2002 |
| JP | 2009180792 A | 8/2009 |
| JP | 2013114205 A | 6/2013 |
| JP | 2013-175386 A | 9/2013 |
| WO | 2016003773 A1 | 1/2016 |
| WO | 2018175653 A1 | 9/2018 |

* cited by examiner

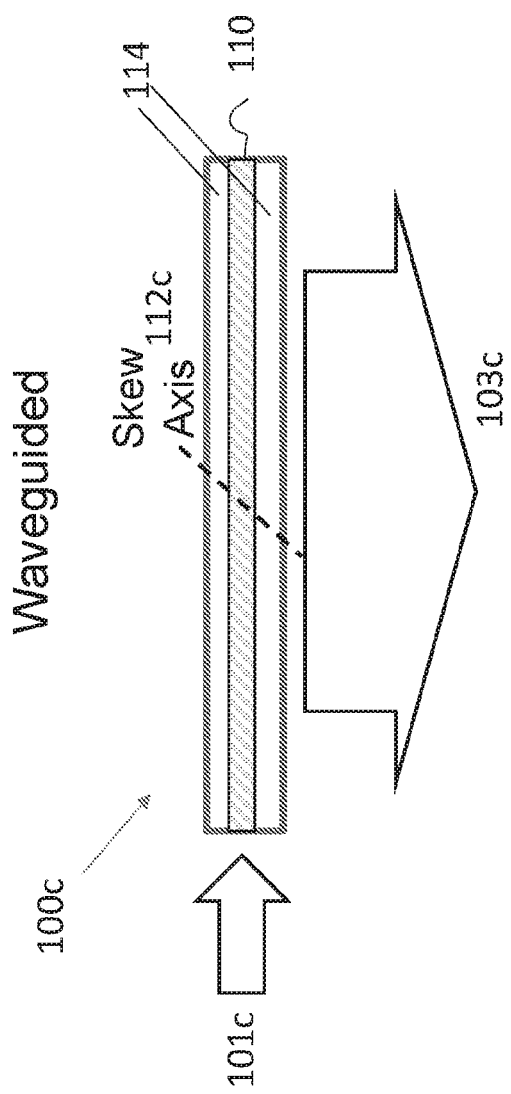

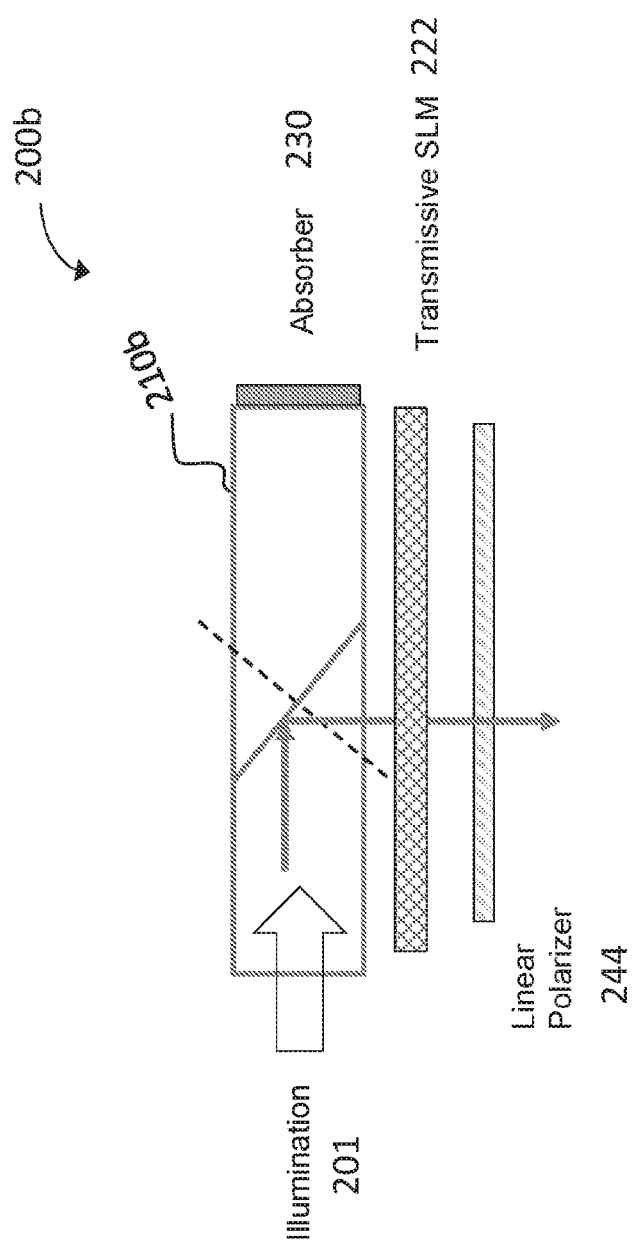

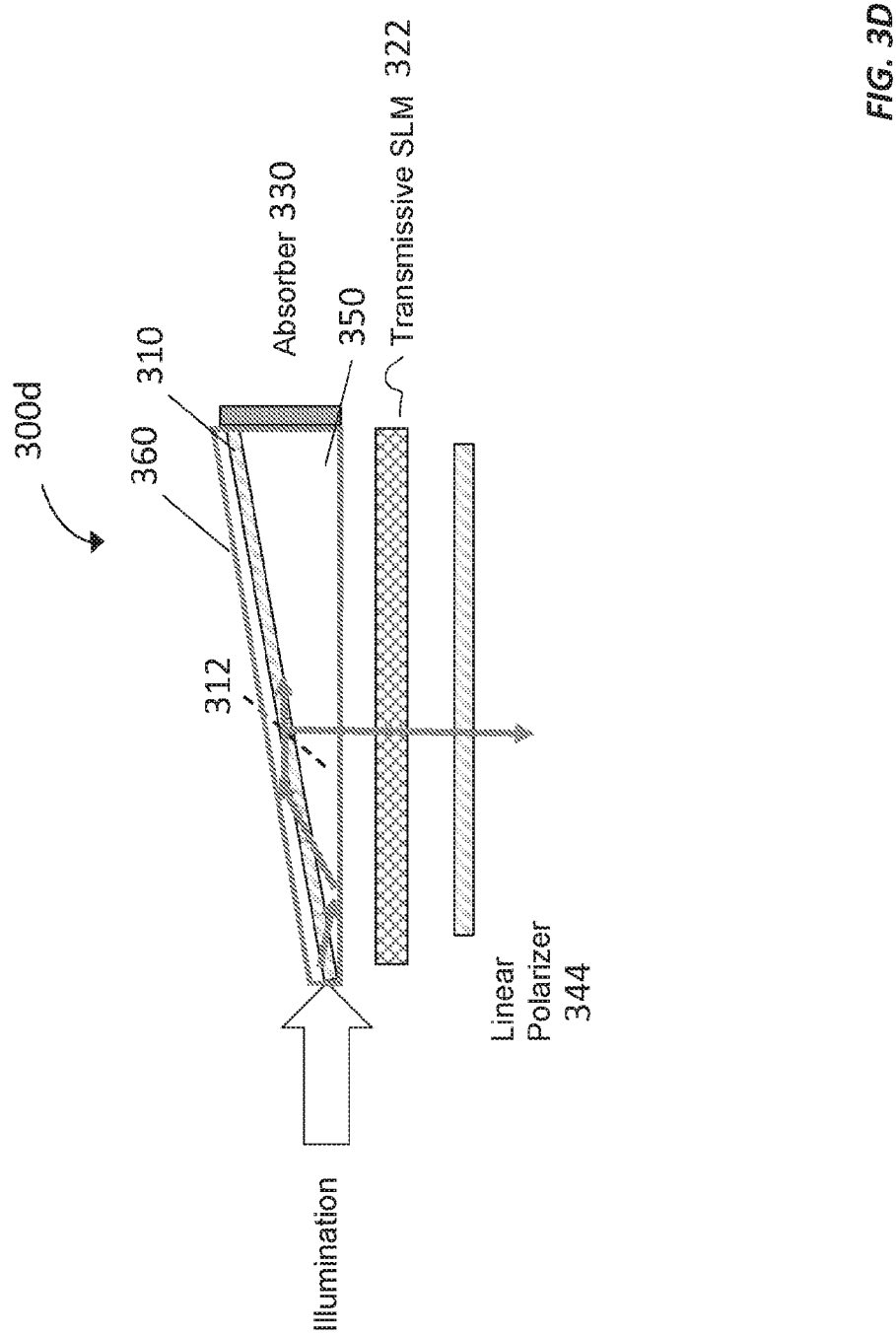

SKEW ILLUMINATOR

CROSS-REFERENCE TO RELATED APPLICATIONS

This application claims the priority benefit, under 35 U.S.C. § 119, of U.S. Application No. 62/459,553, filed Feb. 15, 2017, and entitled "Skew Illuminator." This application is incorporated herein by reference in its entirety.

BACKGROUND

A holographic skew mirror is a holographic optical element that reflects incident light about a reflective axis that need not be perpendicular to the surface upon which the incident light impinges. In other words, a holographic skew mirror's reflective axis does not have to be parallel to or coincident with the surface normal of the holographic optical element. The angle between the reflective axis and the surface normal is referred to as the reflective axis angle and can be selected based on the desired application of the holographic skew mirror.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating or skew mirror is said to be structured to "reflect" incident light, a conventional artisan might prefer to say the grating structure is structured to "diffract" incident light, since grating structures are generally thought to act on light by diffraction. However, such use of the term "diffract" would result in expressions such as "incident light is diffracted about substantially constant reflective axes," which could be confusing.

Accordingly, where incident light is said to be "reflected" by a grating structure, persons of ordinary skill in art, given the benefit of this disclosure, will recognize that the grating structure is in fact "reflecting" the light by a diffractive mechanism. Such use of "reflect" is not without precedent in optics, as conventional dielectric mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

SUMMARY

Embodiments of the present technology include a holographic grating medium having a grating structure configured to diffract incident light toward an illumination target, such as a painting, photograph, drawing, poster, or spatial light modulator (SLM). The grating structure is also configured to transmit light scattered or retro-reflected by the illumination target towards the holographic grating medium. The grating structure may be configured to diffract the incident light in a first polarization state (e.g., the s polarization state) toward the illumination target and to transmit the light in a second polarization state (e.g., the p polarization sate) scattered or retro-reflected by the illumination target towards the holographic grating medium. In some cases, the holographic grating medium can guide the incident light to the grating structure.

Further embodiments include a method of illuminating an illumination target, such as a painting, photograph, drawing, poster, or SLM. A grating structure residing in a holographic grating medium diffracts incident light toward the illumination target, which reflects and/or scatters a first portion of the incident light back toward the holographic grating medium. The grating structure transmits at least some of the first portion of the incident light.

In some examples, the grating structure diffracts incident light in a first polarization state (e.g., the s polarization state), the illumination target changes the first polarization state to a second polarization state (e.g., the p polarization state) upon reflection, and the grating structure transmits at least some light in the second polarization state. If the illumination target is an SLM, it may spatially modulate the light upon reflection (e.g., by changing its amplitude, phase, or polarization state). If desired, the holographic grating medium may guide the incident light to the grating structure.

Other embodiments include a system comprising an SLM in optical communication with a holographic grating medium. In operation, a grating structure in holographic grating structure diffracts incident light toward the SLM about an axis forming an angle with a surface normal of an active area of the SLM.

The SLM may have a pixel pitch of less than about 10 μm and can be transmissive or reflective. If the SLM is reflective, the grating structure may transmit light reflected by the reflective SLM toward the grating structure. In any of these cases, the holographic grating medium can have a length equal to or greater than a length of the active area of the SLM and a thickness less than the length of the active area of the SLM.

The grating structure's reflectivity may vary as a function of position. Likewise, the angle with the surface normal of the active area of the SLM can vary as a function of position with the holographic grating medium. In operation, the grating structure may reflect s-polarized light towards the SLM, the SLM may transform the s-polarized to p-polarized light and reflect the p-polarized light towards the grating structure, and the grating structure may transmit the p-polarized light. In these cases, a polarizer in optical communication with the holographic grating medium can polarize the light propagating toward the grating structure.

In some examples, the holographic grating medium forms at least a portion of a waveguide. These examples may also include a collimator, in optical communication with the waveguide, to couple the incident light into the waveguide and/or an absorber, in optical communication with the waveguide, to absorb at least some light not reflected by the grating structure.

The waveguide may comprise a wedged substrate, in which case the grating structure may diffract light guided by the waveguide over an angular range greater than a prism angle of the wedged substrate. The wedged substrate can be disposed between the holographic grating medium and the SLM, or the holographic grating medium can be disposed between the wedged substrate and the SLM. If the wedged substrate is disposed between the holographic grating medium and the SLM, the system may also include a compensating prism, in optical communication with the SLM and the wedged substrate, to compensate for refraction of light reflected by the SLM through the wedged substrate. Some systems may include holographic recording mediums disposed on both sides of the wedged substrate, with each holographic grating medium having a grating structure that diffracts the incident light toward the SLM.

Yet other embodiments include skew illuminators. An example skew illuminator comprises a waveguide comprising a holographic grating medium sandwiched between a first substrate and a second substrate. The holographic grating medium has a grating structure that reflects s-polarized light (e.g., red, green, and/or blue s-polarized light) guided by the waveguide about a skew axis forming an angle of about 45° with respect to a planar surface of the first substrate. The s-polarized light reflected by the grating structure may have an angular bandwidth about equal to an angular bandwidth of the light guided by the waveguide.

In some cases, the grating structure can transmit p-polarized light incident on the planar surface at a 90° angle. In these cases, the skew illuminator may also include a reflective SLM in optical communication with the grating structure. In operation, the reflective SLM transforms the s-polarized reflected by the grating structure into the p-polarized light incident on the planar surface.

Still further embodiments include a system with a holographic grating medium comprising a plurality of gratings configured to diffract s-polarized light and a wedge prism in optical communication with the holographic grating medium. In operation, the wedge prism transmits the s-polarized light diffracted by the plurality of gratings. The gratings may diffract the s-polarized light over an angular range greater than a prism angle of the wedge prism. And the wedge prism may couple s-polarized light refracted out of the holographic grating medium back into the holographic grating medium. Such a system may also include a reflective SLM, in optical communication with the holographic grating medium and the wedge prism, to transform the s-polarized light into p-polarized light and to reflect the p-polarized light through the wedge prism and the holographic grating medium.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1C shows a waveguided skew illuminator.

FIG. 2B shows a polarizing, waveguided skew illuminator used with a transmissive SLM.

FIG. 3D shows a wedged, waveguided skew illuminator used in a transmissive geometry.

DETAILED DESCRIPTION

1 Reflective, Transmissive, and Waveguided Skew Illuminators

In a holographic skew mirror, incident light is reflected about a reflective axis that can be tilted with respect to the surface upon which it impinges. A skew mirror may advantageously expand a narrow beam into a wide beam, with little or no impact on the angular bandwidth of the illumination. When used for illumination, a skew mirror that expands a narrow beam into a wide beam is called a skew illuminator. A skew illuminator that couples light into or out of a waveguide or that forms the core of a waveguide may be called a skew coupler or skew waveguide coupler.

Figure 1B:
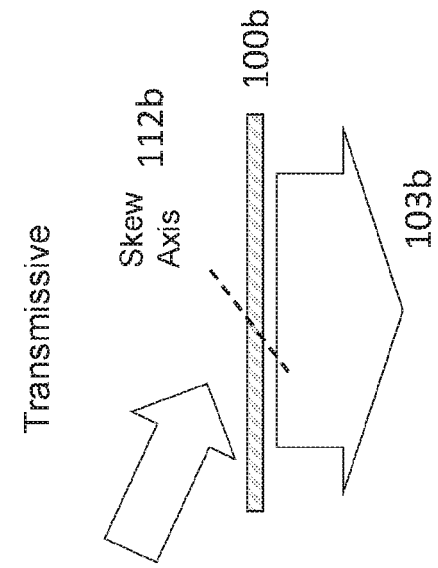
FIG. 1B shows a transmissive skew illuminator.
Figure 1A:
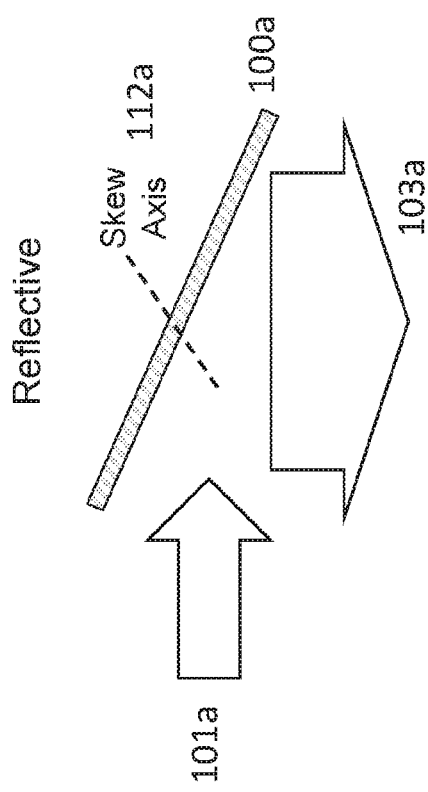
FIG. 1A shows a reflective skew illuminator.

FIGS. 1A, 1B, and 1C illustrate skew illuminators in reflective, transmissive, and waveguided configurations. FIG. 1A shows a reflective skew illuminator 100a that reflects incident light 101a about a skew axis 112a to form an expanded beam 103a. It includes a holographic grating medium programmed with a grating structure 110a that defines the skew axis 112a. It has a lower profile that a mirror or reflective prism and also functions as a beam expander. The skew illuminator 100a can have high reflectivity for an input beam with a small angular bandwidth (e.g., a collimated input beam) at each of several narrow, well-separated spectral bands (e.g., red, green, and blue bands).

FIG. 1B shows a transmissive skew illuminator 100a that reflects (diffracts) incident light 101b about a skew axis 112b to form an expanded beam 103b. (As explained above, the term "reflection" and similar terms are used in this disclosure in some cases where "diffraction" might ordinarily be considered an appropriate term.) It also includes a holographic grating medium programmed with a grating structure that defines the skew axis 112b.

FIG. 1C shows a waveguided skew illuminator 100c with a holographic grating medium 110 sandwiched between a pair of substantially index-matched layers 114. Because the layers 114 are index-matched to the holographic grating medium 110, total internal reflections (TIRs) take place at the waveguide/air boundary, not at the medium/layer interface. As a result, the whole waveguide 100c is index-matched and acts as a monolithic waveguide.

The waveguide skew illuminator 100c guides and reflects incident light 101c about a skew axis 112c to form an expanded beam 103c that propagates out of the waveguide skew illuminator 100c. The waveguided skew illuminator 100c has an even lower profile and expands the input beam 101c by even more, on a relative basis, than the reflective skew illuminator 110a in FIG. 1A. If the diffraction efficiency of the grating structure in the waveguided skew illuminator 100c is low enough, the light reflected out of the waveguided skew illuminator 100c can be reflected back through the waveguided skew illuminator 100c by an illuminated object, such as a reflective spatial light modulator (SLM). This would work with or without changing the polarization state of the reflected light.

The skew illuminators 100a-100c shown in FIGS. 1A-1C can be formed by recording a grating structure in a holographic recording medium, such as the AK233-200 photosensitive polymeric optical recording medium from Akonia Holographics, LLC (Longmont, Colo.). This grating structure may comprise many (e.g., tens, hundreds, or thousands) of multiplexed holographic gratings, also called gratings or holograms, each of which has a grating period and grating vector selected to yield a skew axis that forms an angle with the surface normal the holographic recording medium. The exact number, orientations, and periods of these holographic gratings may depend on the skew illuminator's intended use and operating wavelength.

Reflective, transmissive, and waveguided skew illuminators may be used for lighting, backlighting, and other applications. More specifically, they can be used for lighting for holographic displays, printed posters, paintings, photographs, or other types of artwork; diffusers for lamps or lighting systems; and front lighting for liquid-crystal displays (LCDs), including lighting for passive LCD display (e.g., as an aftermarket add-on for an Amazon Kindle) or front-lit LCDs. They can also be used in reverse, e.g., as light collectors/concentrators for solar cells.

Figure 1D:
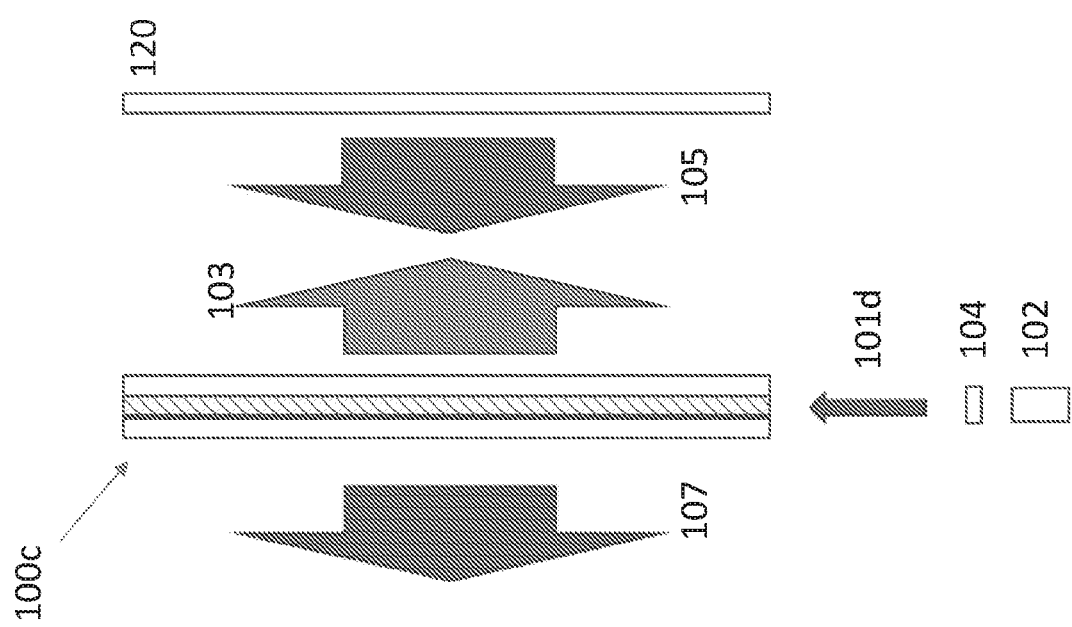
FIG. 1D shows the waveguided skew illuminator of FIG. 1C used for front-illumination of an illumination target, such as a reflective display, painting, photograph, drawing, or poster.

FIG. 1D illustrates the waveguided skew illuminator 100c of FIG. 1C used for front-lighting of an illumination target 120, such as a holographic display, printed poster, painting, photograph, drawing, or reflective passive LCD. A light source 102, such as one or more light-emitting diodes (LEDs) and a collimator 104 produce a collimated beam that is coupled into the waveguided skew illuminator 100c. As the beam propagates through the waveguided skew illuminator 100c (from bottom to top in FIG. 1D), it is diffracted out of the waveguided skew illuminator 100c towards the illumination target 120. This diffraction may yield spatially uniform illumination 103, depending on the spatial variation in the reflectivity/diffraction efficiency of the grating structure in the waveguided skew illuminator 100c. The illumination target 120 scatters and/or reflects light 105 back towards the waveguided skew illuminator 100c, which transmits at least a portion 107 of the light away from the illumination target 120 and possibly towards someone looking at the illumination target.

For more on holographic skew mirrors, including details on how to make skew mirrors, see International Application No. PCT/US2016/048499, entitled "Skew Mirrors, Methods of Use, and Methods of Manufacture"; International Application No. PCT/US2017/020087, entitled "Wide Field-of-View Holographic Skew Mirrors"; and International Application No. PCT/US2017/056404, entitled "Skew Mirror Having Optical Power," each of which is incorporated by reference herein in its entirety.

2 Beam-Splitting Skew Mirror Illuminators

Beam-splitting skew illuminators may be used, for example, for front illumination of reflective displays, such as liquid crystal on silicon (LCOS) spatial light modulators (SLMs) for micro-displays or larger LCDs for televisions, laptop or desktop computer monitors, or handheld electronic devices, such as smartphones and tablets. Beam-splitting illuminators may be polarizing, non-polarizing, or partially-polarizing. Polarizing beam-splitting skew illuminators are useful for right-angle diffraction geometries (e.g., as in FIG. 2A), whereas non-polarizing and partially-polarizing are useful in geometries where the light diffracts at angles other than 90°, for example, as in FIG. 6. But even with a non-polarizing design, it may be challenging to provide completely unpolarized illumination because gratings tend to be weakly polarizing, even far from 90° deflection.

Figure 2A:
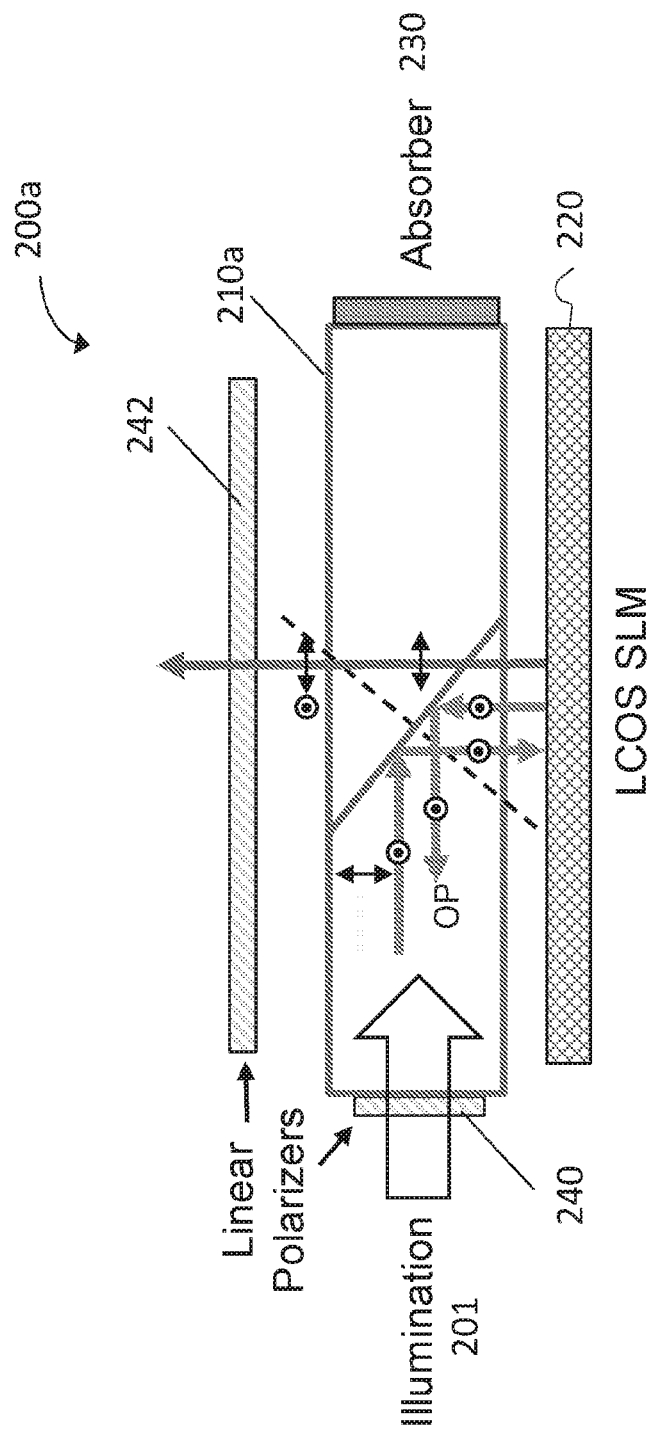
FIG. 2A shows a polarizing, waveguided skew illuminator used with a reflective liquid crystal on silicon (LCOS) spatial light modulator (SLM).

FIG. 2A illustrates a polarizing beam splitter waveguide skew illuminator 210a used to illuminate an LCOS SLM 220 in a low-profile system 200a. In FIG. 2A, substantially collimated light 201 enters the waveguide skew illuminator 210a from the left. An input linear polarizer 240 converts the input light to the 's' polarization state if the input light is unpolarized. As the light propagates along the waveguide skew illuminator 210a, a portion is diffracted downwards by a grating structure (skew mirror) programmed into the waveguide skew illuminator 210a with a skew axis 212a at 45° (dashed black line). The diffracted light illuminates the LCOS SLM 220 at bottom.

The LCOS SLM 220 is comprised of pixels, each of which is configured to reflect light while imparting a controllable polarization rotation. Pixels in the 'off' state impart no change in polarization (polarization rotation=0), and thus light impinging on 'off' pixels remains in the 's' polarization state upon reflection by the SLM 220, so that most of the light is reflected back towards the illumination source along the path labeled "OP" in FIG. 2A. Any 's' polarized light that is transmitted through the skew mirror is blocked by an output linear polarizer 242 at the top of FIG. 2A.

LCOS SLM pixels in an 'on' or 'partially on' state rotate the 's' polarized light wholly or partially to the 'p' polarization state. Because the electric field of the 'p' polarized light is substantially parallel to the reflection path, little to none of the 'p' polarized light is reflected by the skew illuminator 210a. Thus, most of the 'p' polarized light reflected by the 'on' pixels passes through the skew illuminator 210a and output linear polarizer 242, contributing to a spatially modulated output beam.

The skew illuminator 210a in FIG. 2A acts as an ideal polarizing beam splitter for rays at an incidence angle of 45° with respect to the skew axis 212a (i.e., the condition for 90° reflection). As the ray angle deviates from this angle, the skew mirror's reflectivity for 'p' polarized light increases. Thus, the system 200a of FIG. 2A may work most efficiently in the regime where both the input illumination 201 and the light reflected from the SLM are nearly collimated. The divergence angle of the input illumination may be controlled by external means, such as a collimating lens or collimating coupler at the input of the waveguide. This collimating lens can even be recorded in the holographic medium that forms the core of the waveguide. The divergence angle of the reflected light is a function both of the incident collimation and the pixel pitch, which introduces diffractive angular spreading.

For commercially available SLMs with pixel pitches of a few microns, the diffractive angular spreading is only a few degrees and incurs negligible polarization leakage. The use of input and/or output linear polarizers 240, 242 produces a high pixel contrast ratio even when the polarization separation of the skew illuminator 210a is less than ideal. Means for suppressing stray light, such as the illustrated absorber 230, may also improve the contrast ratio.

The system 200a of FIG. 2A may also benefit from spatially modulating the reflectivity of the skew illuminator 210a to improve the uniformity of the SLM illumination. For example, the reflectivity of the right portion of the skew illuminator 210a may be made higher than the reflectivity of the left portion of the skew illuminator 210a so that the illumination of right side of the LCOS SLM 220 is substantially equal to that of left side of the LCOS SLM 220 even though the light in the waveguide is partially depleted as it propagates through the skew illuminator 210a. For example, the skew illuminator 210a may have an exponentially increasing reflectivity with length constant selected to give uniform illumination over the desired distance. This sort of variable reflectivity can be achieved by varying the hologram recording intensity as a function of hologram position within the skew illuminator 210a.

FIG. 2B illustrates a waveguide skew illuminator 210b used to illuminate a transmissive SLM 222 in a low-profile system 200b. In FIG. 2B, substantially collimated light 201 enters the waveguide skew illuminator 210b from the left. An input linear polarizer (not shown) converts the input light to a linear polarization state if the input light is unpolarized. As the light propagates along the waveguide skew illuminator 210b, a portion is diffracted about a skew axis 212b downwards by a grating structure (skew mirror) programmed into the waveguide skew illuminator 210b. In this case, the skew axis 212b is at about 45° (dashed black line). The diffracted light illuminates the transmissive SLM 222 at bottom.

The transmissive SLM 222 is comprised of pixels, each of which is configured to transmit light while imparting a controllable polarization rotation. Pixels in the 'off' state impart no change in polarization (polarization rotation=0), and thus light impinging on 'off' pixels remains in the 's' polarization state upon transmission by the SLM 222. Transmissive SLM pixels in an 'on' or 'partially on' state rotate the incident polarized light to a different polarization state. A linear polarizer 244 transmits light from the 'on' pixels and blocks light from the 'off' pixels (or vice versa, depending on its orientation) to produce a spatially modulated output.

3 Wedged Skew Illuminators

A skew illuminator may be configured in a wedged waveguide in order to utilize an uncollimated illumination source. A wedged skew illuminator may be substantially more compact (e.g., more than 80% thinner) than a conventional 45° polarizing beam splitter (PBS) illumination system, allowing LCOS SLMs to be used for applications formerly requiring emissive (e.g., organic light emitting diode (OLED)) or transmissive SLMs. A wedged skew illuminator may be also be substantially more compact than a curved polarizer illuminator, while offering a higher illumination efficiency.

Figure 3A:
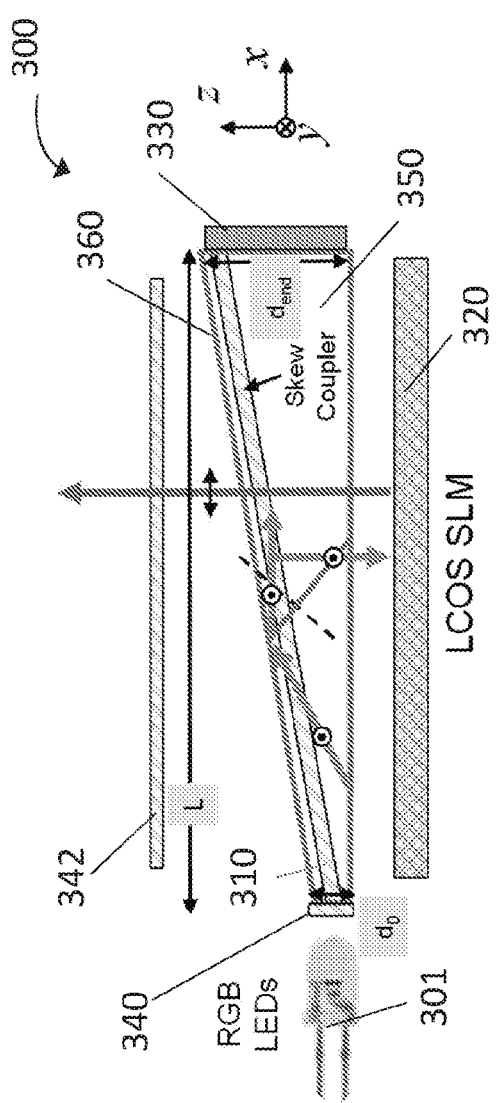
FIG. 3A shows a wedged, polarizing, waveguided skew illuminator used in a reflective geometry with a reflective LCOS SLM.

FIG. 3A illustrates a holographic grating medium 310 used to illuminate an LCOS SLM 320 in a low-profile, wedged, polarizing beam splitter, waveguide skew illuminator system 300a. The holographic grating medium 310 is disposed between a pair of substrates: a planar substrate 360, such as a 100 μm thick piece of Willow glass, opposite the holographic grating medium 310 from a reflective LCOS SLM 320 and a wedged substrate or prism 350 between the holographic grating medium 310 and the SLM 320.

The input illumination may be uncollimated; for example, it may be provided by attaching a red-green-blue (RGB) light-emitting diode (LED) 301 directly to an input facet with an optical adhesive. Such illumination may substantially fill every location of an input aperture with every total internal reflection (TIR) propagation angle. An optional input polarizer 340 may be disposed between the LED 301 and the input facet to polarize the input illumination in the 's' polarization state. And an output polarizer 342 attenuates stray light and transmits light reflected by the 'on' pixels in the SLM 320. An absorber 330 at the other end of the waveguide holographic grating medium 310 absorbs light that hasn't been reflected towards the SLM 320.

The wedged holographic grating medium 310 operates in a manner similar to the one shown in FIG. 2A, except that the waveguide has been formed in a wedge shape. The holographic grating medium 310 has a skew axis 312 that forms an angle of about 45° with the surface of the wedge 350 closest to the SLM 320. It diffracts light propagating close to parallel to the x axis (e.g., within ±2° of the x axis) about this skew axis 312 towards the SLM 320. Because this angular range is small, the diffraction efficiency may be high (e.g., about 79%). Light rays at propagating at higher angles (e.g., more than ±2° from the x axis) pass through the holographic grating medium 310 with little diffraction. However, each internal reflection off the external surface of skew illuminator system 300a reduces the ray angle by twice the apex angle, or wedge angle, of the wedge 350. Light rays at higher angles may reflect down the waveguide one or more times, and then pass through the holographic grating medium 310 at an angle within the diffracting range. Thus, light rays at lower angles (with respect to the x axis) tend to be out-coupled after fewer reflections, illuminating the left portion of the SLM 320. Conversely, light rays at higher angles tend to be out-coupled after more reflections, illuminating the right portion of the SLM 320.

The apex angle and thickness of the wedge 350 may be selected so that rays injected at about the critical angle for the waveguide holographic grating medium 310 enter the capture angle range of the output coupler at the end of the waveguide holographic grating medium 310. This condition may be found using a ray trace by setting the height of the input facet, do, the wedge length, L, and the coupler bandwidth, and varying the wedge angle. For practical values of input facet height, wedge length, and coupler bandwidth, wedge angles that satisfy this condition range from about 1° to about 20°.

The wedge 350 advantageously utilize a large portion of the input light while providing spatially uniform illumination to the SLM 320. The system may also benefit from spatially modulating the reflectivity of the holographic grating medium 310 to further improve uniformity, e.g., by varying the diffraction efficiency of the grating structure as described above with respect to FIG. 2A. The desired spatial modulation can be determined by modeling or testing a skew illuminator and determining a compensating recording illumination pattern that improves uniformity. Together, the wedge 350 and spatially varying diffraction efficiency of the skew illuminator may produce an illumination pattern that is more uniform than the exponentially-increasing illumination pattern of a flat skew illuminator like the one shown in FIG. 2A.

Figure 3C:
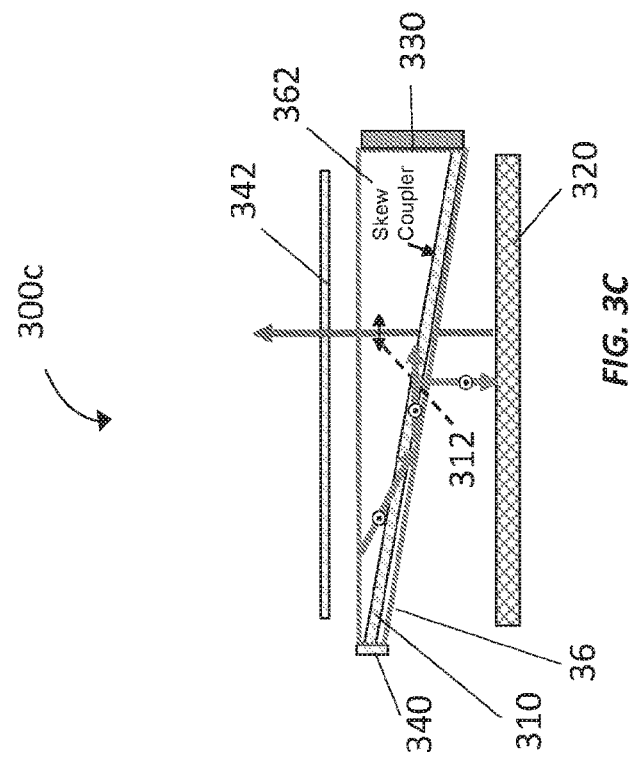
FIG. 3C shows a polarizing, waveguided skew illuminator disposed between a wedge and a reflective LCOS SLM.
Figure 3B:
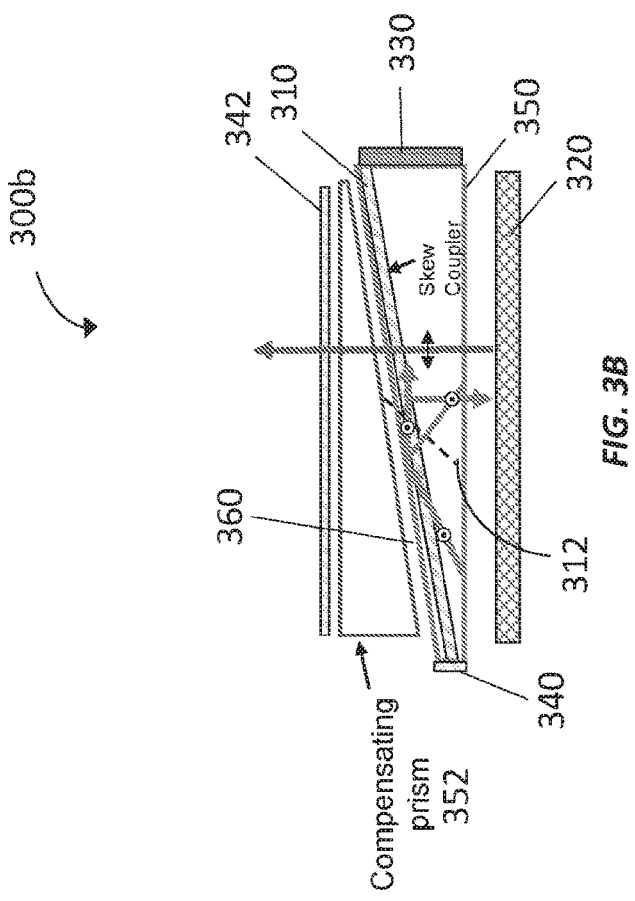
FIG. 3B shows a wedged, polarizing, waveguided skew illuminator used in a reflective geometry with a reflective LCOS SLM and a compensating prism.

There are many variations on the wedged skew illuminator system 300a shown in FIG. 3A. For example, FIG. 3B shows a wedged skew illuminator system 300b with a compensating prism 352 between the upper substrate 360 and the output polarizer 342. The compensating prism 352 compensates for refraction of light reflected from the SLM 320 at the boundary between the upper substrate 360 and air. The material of compensating prism 352 may also be selected to compensate for the dispersion of the wedge package. FIG. 3C shows a wedged skew illuminator system 300c that has been "flipped upside down," with a wedge 362 as the upper substrate between the holographic grating medium 310 and the output polarizer 342 and a planar substrate 364 on the side of the holographic grating medium 310 facing the SLM 320. In this case, the holographic grating medium 310 operates in a reflective mode (e.g., as in FIG. 1A) instead of in a transmissive mode (e.g., as in FIGS. 1B and 3A). And FIG. 3D shows a wedged skew illuminator system 300d with a transmissive SLM 322 between the wedge 350 and a linear output polarizer 344. This system 300d operates much like the transmissive system 200b shown in FIG. 2B.

Figure 3E:
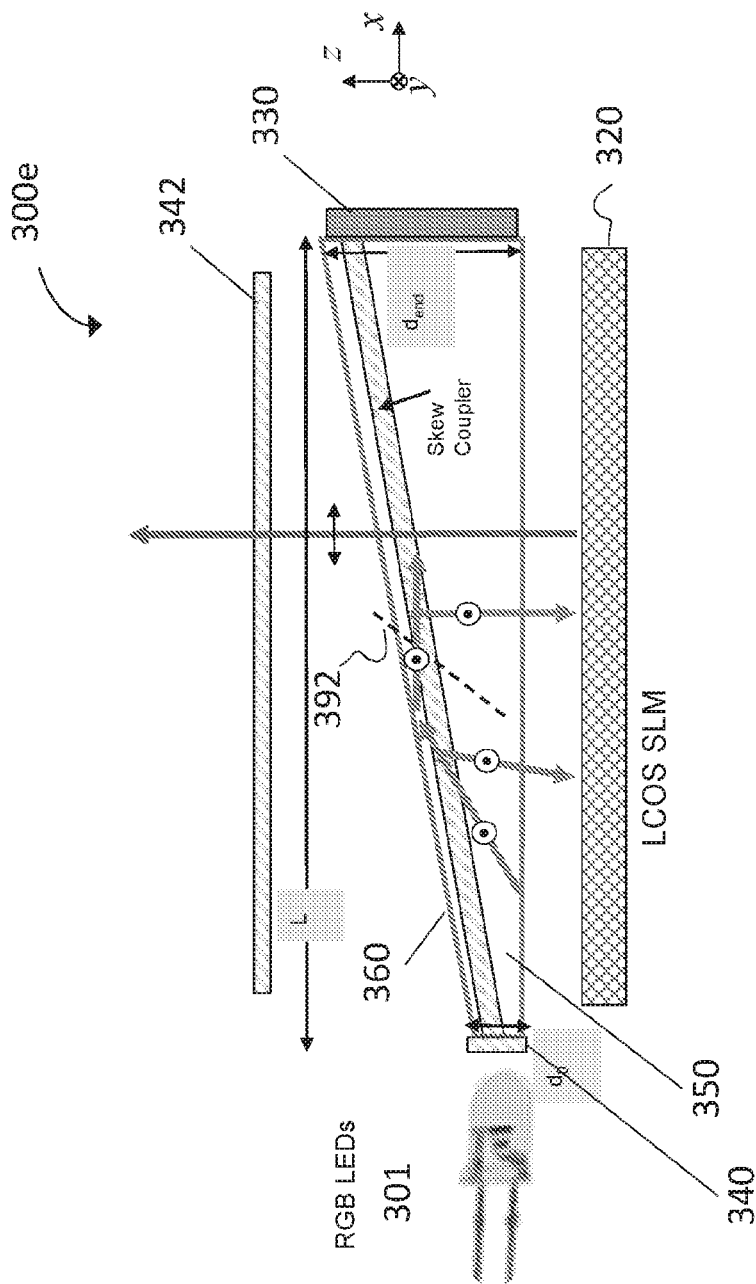
FIG. 3E shows transmission and reflection with a wedged, waveguided skew illuminator whose diffracted angle range is greater than the wedge angle.

FIG. 3E shows a wedged skew illuminator system 300e with a skew illuminator 390 whose diffracted angle range is greater than the wedge angle of the prism 350 (e.g., ±8° instead of ±2°). This is illustrated in FIG. 3E by the ray reflecting about a skew axis 392 off of the grating structure in the skew illuminator 390 on the way towards the upper substrate 360 (reflection) in addition to the ray reflecting off of the grating structure in the on the way towards the SLM 320 (transmission). In this case, the skew illuminator 390 has enough angular range to reflect rays entering from either side. Because the diffracted angle range is greater than the wedge angle, then the grating structure is transmissive and reflective because it is Bragg-matched to rays entering from both surfaces of the skew illuminator system 310e.

Figure 4:
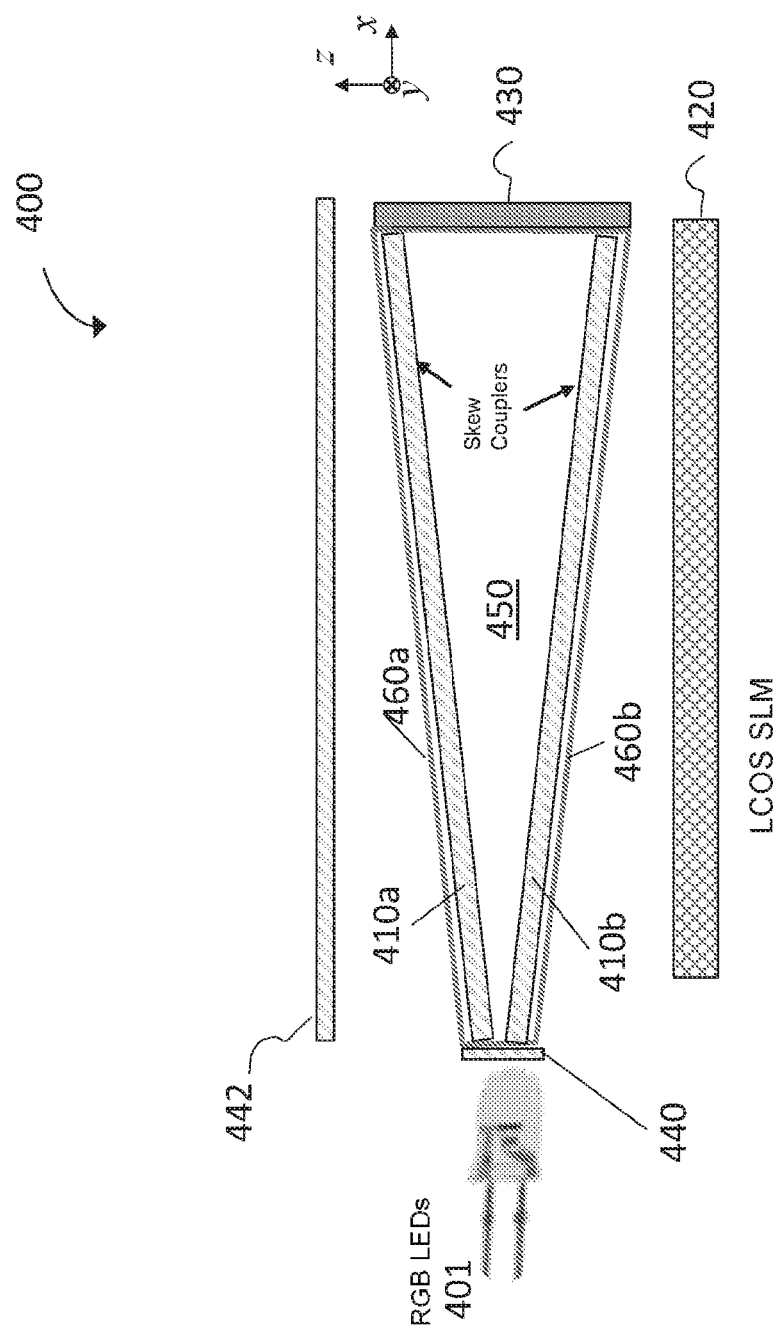
FIG. 4 shows a wedged, waveguided skew illuminator with multiple couplers.

FIG. 4 shows a wedged, waveguided skew illuminator system 400 with two skew couplers: an upper skew coupler 410a and a lower skew coupler 410b (collectively, skew couplers 410). The skew couplers 410 are disposed on the equal-length sides of an isosceles triangular prism 450. An upper substrate 460a and a lower substrate 460b (collectively, substrates 460) on the outer surfaces of the upper skew coupler 410a and lower skew coupler 410b, respectively, help to guide the light within the skew couplers 410.

One or more RGB LEDs 401 couple light into the skew illuminator system 400 via an input polarizer 440.

Grating structures programmed into the skew couplers 410 reflect at least some of the guided light about respective skew axes (not shown) towards a reflective LCOS SLM 420. These skew axes may form 45° angles with the surface or active area of the SLM 420. The SLM 420 modulates and reflects the light upward through skew couplers 410 and prism 450 towards an output polarizer 442 as described above with respect to FIG. 2A. (A transmissive SLM can be used instead of the reflective SLM 420 as described above with respect to FIG. 2B.) An absorber at the far end of the wedged, waveguided skew illuminator system 400 may absorb any light that isn't guided by the skew couplers 410 or reflected towards the SLM 420.

4 Simulated Design and Performance of a Polarizing Wedged Skew Illuminator

Figure 5C:
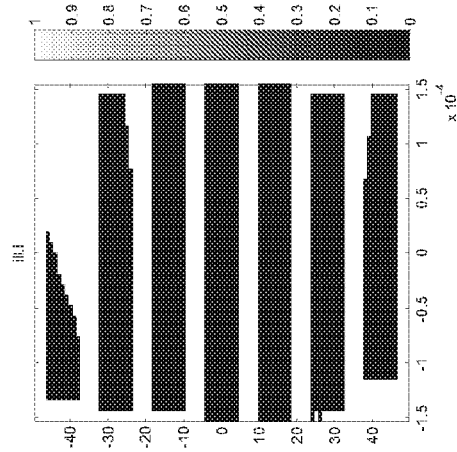
FIG. 5C is a plot of rays captured by the skew coupler as a function of input position (x-axis) and internal angle (y-axis) using the reflective geometry shown in FIG. 3A.
Figure 5A:
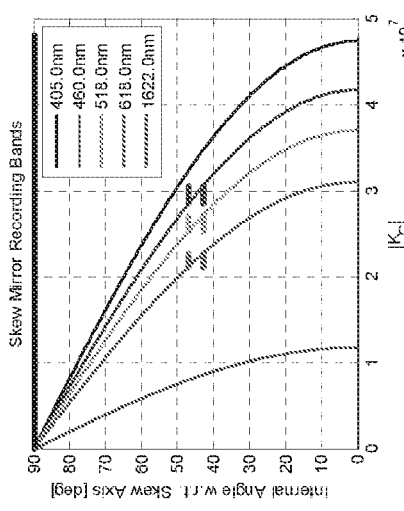
FIG. 5A is a plot of internal angle with respect to skew axis versus grating vector length for a skew illuminator designed to illuminate an SLM via a wedge prism with a 7° prism angle using the reflective geometry shown in FIG. 3A.
Figure 5B:
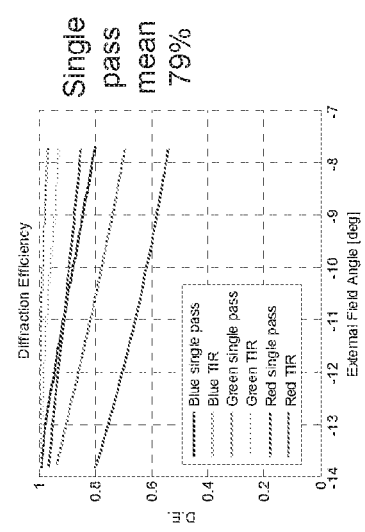
FIG. 5B is a plot of diffraction efficiency (D.E.) versus external field angle for a skew illuminator designed to illuminate an SLM via a wedge prism with a 7° prism angle.

FIGS. 5A-5C are plots generated with computer code for estimating the illumination efficiency of a wedged illuminator design like the one shown in FIG. 3A. This computer code was stored in a non-volatile computer memory and executed with a computer processor.

The wedged illuminator simulated with the computer code employed a $\theta=7°$ wedge angle with a 100 μm thick skew coupler layer (e.g., holographic grating medium 310 in FIG. 3A). The thickness of the input edge was $d_0=300$ μm, and the length was L=5.9 mm, giving a maximum thickness of $d_{end}=L \tan \theta + d_0 = 1020$ μm. This is considerably thinner than an equivalent conventional beam splitter cube, which would be 5.9 mm high.

The skew mirror included a grating structure comprised of 141 holograms, which, when recorded in a medium with a dynamic range of $\Delta n_{max}=0.09$, each had a diffraction efficiency of about 79%. Collectively, the holograms covered a 4° range of incidence angles. The skew coupler has a skew axis angle of −52° with respect to the recording layer, which corresponds to −45° with respect to the x axis in FIG. 3A. This condition maintains the polarizing properties of the system of FIG. 3A. The grating vector table is shown below in TABLE 1.

The computer code estimated illumination efficiency by tracing a large number of rays originating from the input edge and summing the diffraction contribution from each. Rays that reflect off the upper surface within the 4° range of Bragg-matched angles contribute 79% of their power to the illumination efficiency; those that never meet this condition contribute nothing.

The plot in FIG. 5C indicates the rays contributing to diffraction (black regions) according to their launch height (x axis) and angle (y axis). On net, 54% of the rays diffracted, leading to a 43% total illumination efficiency, which is to say that 43% of the light entering the waveguide is out-coupled towards the SLM. Higher total illumination efficiency (e.g., 50%, 60%, 70%, 80%, or 90%) is also possible; the total illumination efficiency could approach 100% with a sufficient refractive index difference.

TABLE 1

Grating Vectors for Computer Simulation of a Wedged Skew Illuminator
Grating Table Skew Illumination Coupler v1.0 - 141 gratings
Coupler thickness 100 um
460.00 nm index 1.5300
518.00 nm index 1.5300
618.00 nm index 1.5300

| Grating No. | Kg_x | Kg_y | Kg_z | n1 |
| --- | --- | --- | --- | --- |
| 1 | −24079600 | 0 | 18813000 | 0.000640 |
| 2 | −24049100 | 0 | 18789200 | 0.000640 |
| 3 | −24018600 | 0 | 18765400 | 0.000640 |
| 4 | −23988100 | 0 | 18741600 | 0.000640 |
| 5 | −23957700 | 0 | 18717800 | 0.000640 |
| 6 | −23927200 | 0 | 18694000 | 0.000640 |
| 7 | −23896700 | 0 | 18670100 | 0.000640 |
| 8 | −23866200 | 0 | 18646300 | 0.000640 |
| 9 | −23835700 | 0 | 18622500 | 0.000640 |
| 10 | −23805200 | 0 | 18598700 | 0.000640 |
| 11 | −23774800 | 0 | 18574900 | 0.000640 |
| 12 | −23744300 | 0 | 18551100 | 0.000640 |
| 13 | −23713800 | 0 | 18527200 | 0.000640 |
| 14 | −23683300 | 0 | 18503400 | 0.000640 |
| 15 | −23652800 | 0 | 18479600 | 0.000640 |
| 16 | −23622300 | 0 | 18455800 | 0.000640 |
| 17 | −23591900 | 0 | 18432000 | 0.000640 |
| 18 | −23561400 | 0 | 18408200 | 0.000640 |
| 19 | −23530900 | 0 | 18384400 | 0.000640 |
| 20 | −23500400 | 0 | 18360500 | 0.000640 |
| 21 | −23469900 | 0 | 18336700 | 0.000640 |
| 22 | −23439400 | 0 | 18312900 | 0.000640 |
| 23 | −23409000 | 0 | 18289100 | 0.000640 |

TABLE 1-continued

Grating Vectors for Computer Simulation of a Wedged Skew Illuminator
Grating Table Skew Illumination Coupler v1.0 - 141 gratings
Coupler thickness 100 um
460.00 nm index 1.5300
518.00 nm index 1.5300
618.00 nm index 1.5300

| Grating No. | Kg_x | Kg_y | Kg_z | n1 |
|---|---|---|---|---|
| 24 | −23378500 | 0 | 18265300 | 0.000640 |
| 25 | −23348000 | 0 | 18241500 | 0.000640 |
| 26 | −23317500 | 0 | 18217600 | 0.000640 |
| 27 | −23287000 | 0 | 18193800 | 0.000640 |
| 28 | −23256600 | 0 | 18170000 | 0.000640 |
| 29 | −23226100 | 0 | 18146200 | 0.000640 |
| 30 | −23195600 | 0 | 18122400 | 0.000640 |
| 31 | −23165100 | 0 | 18098600 | 0.000640 |
| 32 | −23134600 | 0 | 18074700 | 0.000640 |
| 33 | −23104100 | 0 | 18050900 | 0.000640 |
| 34 | −23073700 | 0 | 18027100 | 0.000640 |
| 35 | −23043200 | 0 | 18003300 | 0.000640 |
| 36 | −23012700 | 0 | 17979500 | 0.000640 |
| 37 | −22982200 | 0 | 17955700 | 0.000640 |
| 38 | −22951700 | 0 | 17931900 | 0.000640 |
| 39 | −22921200 | 0 | 17908000 | 0.000640 |
| 40 | −22890800 | 0 | 17884200 | 0.000640 |
| 41 | −22860300 | 0 | 17860400 | 0.000640 |
| 42 | −22829800 | 0 | 17836600 | 0.000640 |
| 43 | −22799300 | 0 | 17812800 | 0.000640 |
| 44 | −22768800 | 0 | 17789000 | 0.000640 |
| 45 | −22738300 | 0 | 17765100 | 0.000640 |
| 46 | −22707900 | 0 | 17741300 | 0.000640 |
| 47 | −22677400 | 0 | 17717500 | 0.000640 |
| 48 | −22646900 | 0 | 17693700 | 0.000640 |
| 49 | −22616400 | 0 | 17669900 | 0.000640 |
| 50 | −22585900 | 0 | 17646100 | 0.000640 |
| 51 | −22555500 | 0 | 17622300 | 0.000640 |
| 52 | −22525000 | 0 | 17598400 | 0.000640 |
| 53 | −22494500 | 0 | 17574600 | 0.000640 |
| 54 | −22464000 | 0 | 17550800 | 0.000640 |
| 55 | −21366600 | 0 | 16693400 | 0.000640 |
| 56 | −21336100 | 0 | 16669600 | 0.000640 |
| 57 | −21305700 | 0 | 16645800 | 0.000640 |
| 58 | −21275200 | 0 | 16622000 | 0.000640 |
| 59 | −21244700 | 0 | 16598200 | 0.000640 |
| 60 | −21214200 | 0 | 16574400 | 0.000640 |
| 61 | −21183700 | 0 | 16550500 | 0.000640 |
| 62 | −21153200 | 0 | 16526700 | 0.000640 |
| 63 | −21122800 | 0 | 16502900 | 0.000640 |
| 64 | −21092300 | 0 | 16479100 | 0.000640 |
| 65 | −21061800 | 0 | 16455300 | 0.000640 |
| 66 | −21031300 | 0 | 16431500 | 0.000640 |
| 67 | −21000800 | 0 | 16407600 | 0.000640 |
| 68 | −20970300 | 0 | 16383800 | 0.000640 |
| 69 | −20939900 | 0 | 16360000 | 0.000640 |
| 70 | −20909400 | 0 | 16336200 | 0.000640 |
| 71 | −20878900 | 0 | 16312400 | 0.000640 |
| 72 | −20848400 | 0 | 16288600 | 0.000640 |
| 73 | −20817900 | 0 | 16264800 | 0.000640 |
| 74 | −20787500 | 0 | 16240900 | 0.000640 |
| 75 | −20757000 | 0 | 16217100 | 0.000640 |
| 76 | −20726500 | 0 | 16193300 | 0.000640 |
| 77 | −20696000 | 0 | 16169500 | 0.000640 |
| 78 | −20665500 | 0 | 16145700 | 0.000640 |
| 79 | −20635000 | 0 | 16121900 | 0.000640 |
| 80 | −20604600 | 0 | 16098000 | 0.000640 |
| 81 | −20574100 | 0 | 16074200 | 0.000640 |
| 82 | −20543600 | 0 | 16050400 | 0.000640 |
| 83 | −20513100 | 0 | 16026600 | 0.000640 |
| 84 | −20482600 | 0 | 16002800 | 0.000640 |
| 85 | −20452100 | 0 | 15979000 | 0.000640 |
| 86 | −20421700 | 0 | 15955100 | 0.000640 |
| 87 | −20391200 | 0 | 15931300 | 0.000640 |
| 88 | −20360700 | 0 | 15907500 | 0.000640 |
| 89 | −20330200 | 0 | 15883700 | 0.000640 |
| 90 | −20299700 | 0 | 15859900 | 0.000640 |
| 91 | −20269200 | 0 | 15836100 | 0.000640 |
| 92 | −20238800 | 0 | 15812300 | 0.000640 |
| 93 | −20208300 | 0 | 15788400 | 0.000640 |
| 94 | −20177800 | 0 | 15764600 | 0.000640 |
| 95 | −20147300 | 0 | 15740800 | 0.000640 |
| 96 | −20116800 | 0 | 15717000 | 0.000640 |
| 97 | −20086300 | 0 | 15693200 | 0.000640 |
| 98 | −20055900 | 0 | 15669400 | 0.000640 |
| 99 | −20025400 | 0 | 15645500 | 0.000640 |
| 100 | −19994900 | 0 | 15621700 | 0.000640 |
| 101 | −19964400 | 0 | 15597900 | 0.000640 |
| 102 | −17922100 | 0 | 14002300 | 0.000640 |
| 103 | −17891600 | 0 | 13978400 | 0.000640 |
| 104 | −17861100 | 0 | 13954600 | 0.000640 |
| 105 | −17830600 | 0 | 13930800 | 0.000640 |
| 106 | −17800100 | 0 | 13907000 | 0.000640 |
| 107 | −17769700 | 0 | 13883200 | 0.000640 |
| 108 | −17739200 | 0 | 13859400 | 0.000640 |
| 109 | −17708700 | 0 | 13835500 | 0.000640 |
| 110 | −17678200 | 0 | 13811700 | 0.000640 |
| 111 | −17647700 | 0 | 13787900 | 0.000640 |
| 112 | −17617200 | 0 | 13764100 | 0.000640 |
| 113 | −17586800 | 0 | 13740300 | 0.000640 |
| 114 | −17556300 | 0 | 13716500 | 0.000640 |
| 115 | −17525800 | 0 | 13692700 | 0.000640 |
| 116 | −17495300 | 0 | 13668800 | 0.000640 |
| 117 | −17464800 | 0 | 13645000 | 0.000640 |
| 118 | −17434300 | 0 | 13621200 | 0.000640 |
| 119 | −17403900 | 0 | 13597400 | 0.000640 |
| 120 | −17373400 | 0 | 13573600 | 0.000640 |
| 121 | −17342900 | 0 | 13549800 | 0.000640 |
| 122 | −17312400 | 0 | 13525900 | 0.000640 |
| 123 | −17281900 | 0 | 13502100 | 0.000640 |
| 124 | −17251500 | 0 | 13478300 | 0.000640 |
| 125 | −17221000 | 0 | 13454500 | 0.000640 |
| 126 | −17190500 | 0 | 13430700 | 0.000640 |
| 127 | −17160000 | 0 | 13406900 | 0.000640 |
| 128 | −17129500 | 0 | 13383000 | 0.000640 |
| 129 | −17099000 | 0 | 13359200 | 0.000640 |
| 130 | −17068600 | 0 | 13335400 | 0.000640 |
| 131 | −17038100 | 0 | 13311600 | 0.000640 |
| 132 | −17007600 | 0 | 13287800 | 0.000640 |
| 133 | −16977100 | 0 | 13264000 | 0.000640 |
| 134 | −16946600 | 0 | 13240200 | 0.000640 |
| 135 | −16916100 | 0 | 13216300 | 0.000640 |
| 136 | −16885700 | 0 | 13192500 | 0.000640 |
| 137 | −16855200 | 0 | 13168700 | 0.000640 |
| 138 | −16824700 | 0 | 13144900 | 0.000640 |
| 139 | −16794200 | 0 | 13121100 | 0.000640 |
| 140 | −16763700 | 0 | 13097300 | 0.000640 |
| 141 | −16733200 | 0 | 13073400 | 0.000640 |

5 Spatially Multiplexed Skew Illuminators

Figure 6:
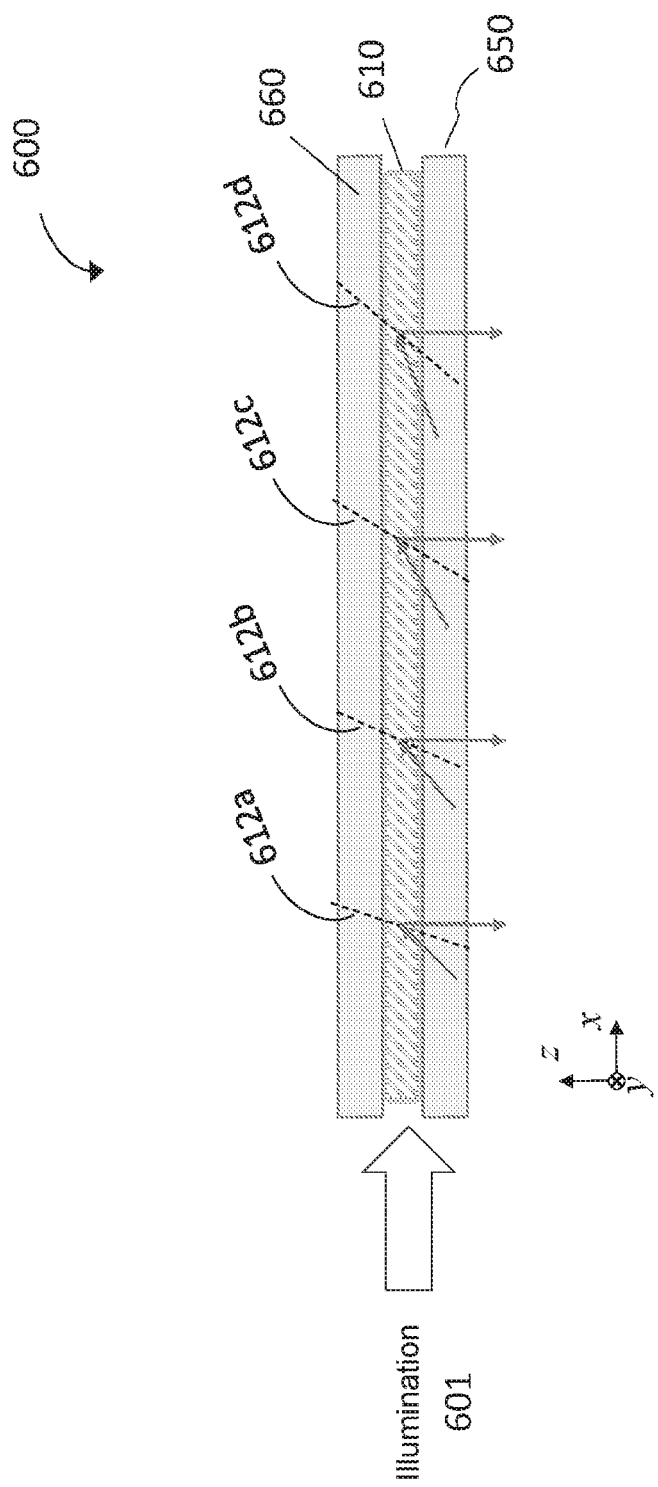
FIG. 6 shows a spatially multiplexed skew illuminator.

FIG. 6 shows a waveguided skew illuminator 600 that employs spatially multiplexing instead of or in addition to a wedge (not shown) in order to utilize uncollimated illumination 601. Like the waveguide skew illuminators discussed above, the spatially multiplexed waveguided skew illuminator 600 includes a holographic medium 610 sandwiched between substrates 650 and 660. The holographic medium 610 is programmed with a holographic grating structure whose skew axis angle varies along the x axis in order to out-couple light propagating at different angles. This variation is illustrated by discrete skew angles 612a-612d in FIG. 6, which form increasing angles with respect to the surface normal as a function of distance from the input. Another version of such a skew illuminator might have a Bragg angle (grating frequency) that varies with respect to the skew axis while keeping the skew axis the same.

The skew illuminator 600 shown in FIG. 6 may not transmit 100% of 'p' polarized light reflected back through the skew illuminator 600 in the z direction, however, since at least some of the light might be diffracting out of the skew illuminator 600 at angles far from 90°. Nevertheless, the performance should be sufficient for applications that don't need a strongly polarizing property.

Note that the skew illuminator 600 shown in FIG. 6 can out-couple light propagating in a wide range of TIR angles. This means that it can operate without externally collimated light, which alleviates constraints on the light source and may eliminate a need for external collimation optics or a wedged-shaped waveguide.

6 Astigmatic Skew Illuminators

Figure 7:
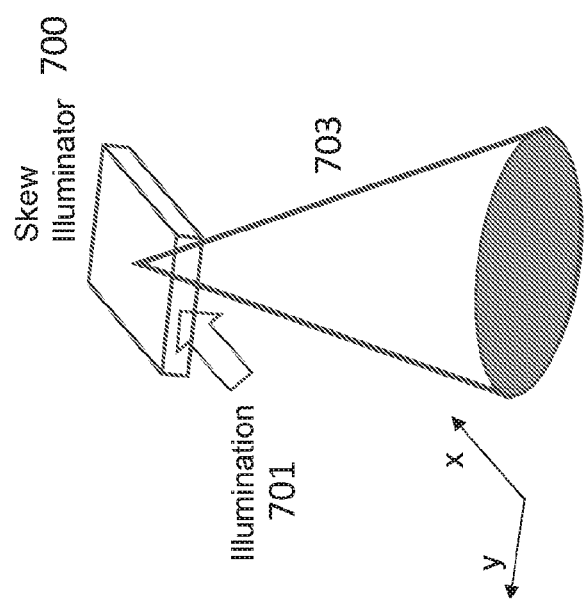
FIG. 7 illustrates astigmatic illumination using a skew illuminator.

As shown in FIG. 7, a skew illuminator 700 may exhibit astigmatic illumination 703 since the angular spread in the x direction is constrained by the diffracted angle range, whereas the angular spread in they direction is not. This may be mitigated by external means, or used to some advantage (e.g., creating an elongated pupil at the output of downstream projection optics). For example, the grating structure in the skew illuminator 700 may be programmed to spatially modulate the angular spread of the output beam in the x direction. Although an external collimator, such as a bulk lens or Fresnel lens can be very useful for collimating the input illumination 701, a collimator on the output may useful only in special cases (e.g., with transmissive SLMs) because it will also be in the path of light reflected back by whatever is being front-illuminated.

7 Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

References in the specification to "one embodiment," "an embodiment," "another embodiment," "a preferred embodiment," "an alternative embodiment," "one variation," "a variation," and similar phrases mean that a particular feature, structure, or characteristic described in connection with the embodiment or variation, is included in at least an embodiment or variation of the invention. The phrases "in one embodiment," "in one variation," and similar phrases, as used in various places in the specification, are not necessarily meant to refer to the same embodiment or the same variation.

The term "approximately," as used in this specification and appended claims, refers to plus or minus 10% of the value given. When the term "approximately" is used together with an angular value, it refers to a range of angles within 0.5 degrees of that angular value (e.g., the phrase "approximately 0 degrees" refers to "±0.5 degrees").

The term "about," as used in this specification and appended claims in conjunction with a numerical value, refers to plus or minus 20% of the numerical value. When the term "about" is used together with an angular value, it refers to a range of angles within 1.0 degrees of that angular value (e.g., the phrase "about 0 degrees" refers to "±1.0 degrees").

The term "generally," as used in this specification and appended claims, means mostly or for the most part.

The term "principally," as used in this specification and appended claims with respect to reflected light, refers to light reflected by a grating structure. Light that is principally reflected at a recited angle includes more light than is reflected at any other angle (excluding surface reflections). Light that is principally reflected about a recited reflective axis includes more reflected light than is reflected about any other reflective axis (excluding surface reflections). Light reflected by a device surface is not included when considering principally reflected light.

The term "reflective axis," as used in this specification and appended claims, refers to an axis that bisects an angle of an incident light ray relative to its reflected light ray. The incident light ray, reflective axis, and reflected light ray all reside in one common plane, which can be referred to as a plane of incidence. The plane of incidence for a skew mirror need not include surface normal, although it may. The magnitude of an angle of incidence of the incident light ray relative to the reflective axis is equal to the magnitude of an angle of reflection of the reflected light ray relative to the reflective axis. For purposes of the foregoing definition of "reflective axis," the angles are internal angles. For conventional dielectric and metal mirrors, the reflective axis is coincident with surface normal, i.e., the reflective axis is perpendicular to the mirror surface, as is the plane of incidence. Conversely, embodiments of skew mirrors according to the present invention may have a reflective axis that differs from surface normal, or may have a reflective axis that is coincident with surface normal. Angles of incidence and angles of reflection are usually, but not necessarily, determined empirically, with multiple measurements (generally three or more) typically used to generate a mean value.

The term "skew axis" as used in this disclosure refers to an axis that represents/coincides with the average direction of grating vectors at a particular spatial location in a grating medium, for one or more volume phase holograms residing at the particular spatial location in the grating medium. Thus, the skew axis has a skew angle that is identical to the average of grating vector angles of the one or more volume phase holograms at the particular location. Persons skilled in the art, given the benefit of this disclosure, will recognize that the grating vector direction for a volume phase hologram is determined by the difference of the wave vectors of the recording beams used to record the volume phase holograms. The reflective axis at the particular location is very similar to the skew axis, though not necessarily identical. The skew angle can be substantially identical to the reflective axis angle, meaning the skew angle is within 1.0 degree of the reflective axis angle. Persons skilled in the art, given the benefit of this disclosure, will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle.

Practically, a spatially varying skew mirror will have "skew axes" and "reflective axes" that are indistinguishable from each other or very close to each other at a given location in the spatially varying skew mirror. In recognition of this, a skew axis/reflective axis is generally called a skew axis in the context describing orientation of gratings or recording beams in a grating medium, and as a reflective axis when referring to light reflective properties of a skew mirror.

The term "reflection" and similar terms are used in this disclosure in some cases where diffraction might ordinarily be considered an appropriate term. This use of "reflection" is consistent with mirror-like properties exhibited by skew mirrors and helps avoid potentially confusing terminology. For example, where a grating structure is said to be configured to "reflect" incident light, a conventional artisan might prefer to say the grating structure is configured to diffract incident light, since grating structures are generally thought to act on light by diffraction. However, such use of the term "diffract" would result in expressions such as "incident light is diffracted about substantially constant reflective axes," which could be confusing. Accordingly, where incident light is said to be "reflected" by a grating structure, persons of ordinary skill in art, given the benefit of this disclosure, will recognize that the grating structure is "reflecting" the light by a diffraction. Such use of "reflect" is not without precedent in optics, as conventional dielectric mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

The terms "hologram" and "holographic grating," as used in this specification and appended claims, refer to a recording of an interference pattern generated by interference between multiple intersecting light beams. A hologram or holographic grating is an example of a grating structure.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system comprising:
   a waveguide having first and second substrates, the first substrate having a first planar surface and a second planar surface parallel to the first planar surface, the second substrate having a third planar surface and a fourth planar surface parallel to the third planar surface, and the third planar surface being parallel to the second planar surface;
   a spatial light modulator (SLM) having a lateral surface parallel to the fourth planar surface;
   a holographic grating medium interposed between and in contact with the second and third planar surfaces, wherein the second substrate is interposed between the holographic grating medium and the SLM; and
   a grating structure in the holographic grating medium and configured to diffract incident light toward the SLM about an axis forming an angle with a surface normal of an active area of the SLM.

2. The system of claim 1, wherein the SLM has a pixel pitch of less than 10 μm.

3. The system of claim 1, wherein the SLM is a transmissive SLM.

4. The system of claim 1, wherein the SLM is a reflective SLM and the grating structure is configured to transmit light reflected by the reflective SLM.

5. The system of claim 1, wherein the holographic grating medium has a length equal to or greater than a length of the active area of the SLM and a thickness less than the length of the active area of the SLM.

6. The system of claim 1, wherein the grating structure has a reflectivity that varies as a function of position.

7. The electronic device of claim 1, wherein the volume holograms are configured to diffract the incident light about an axis forming an angle with the surface normal of the active area of the SLM and wherein the angle varies as a function of position within the holographic grating medium.

8. The system of claim 1, further comprising:
   a collimator configured to couple the incident light into the waveguide.

9. The system of claim 1, further comprising:
   an absorber configured to absorb at least some light not reflected by the grating structure.

10. The system of claim 1, wherein the grating structure has opposing first and second ends, the incident light is incident upon the grating structure at the first end, and the grating structure has a higher diffraction efficiency at the second end than at the first end.

11. The system of claim 10, wherein the grating structure is configured to transmit light that has been reflected by the SLM towards the holographic grating medium.

12. The system of claim 11, wherein the grating structure is configured to diffract the incident light in a first polarization state towards the SLM and is configured to transmit the light that has been reflected by the SLM in a second polarization state that is different from the first polarization state.

13. The system of claim 1, wherein the grating structure is configured to transmit light that has been reflected by the SLM towards the holographic grating medium.

14. The system of claim 13, wherein the grating structure is configured to diffract the incident light in a first polarization state towards the SLM and is configured to transmit the light that has been reflected by the SLM in a second polarization state that is different from the first polarization state.

15. The system of claim 1 wherein the SLM comprises a liquid crystal on silicon (LCOS) SLM.

16. The system of claim 1 wherein the grating structure comprises a plurality of volume phase holograms.

17. An electronic device comprising:
   a waveguide having first and second substrates, the first substrate having a first surface and a second surface parallel to the first surface, the second substrate having a third surface and a fourth surface parallel to the third planar surface, and the third surface being parallel to the second surface;
   a spatial light modulator (SLM) having a lateral surface parallel to the fourth surface;
   a polarizer; and
   a medium having volume holograms configured to diffract incident light toward the SLM, wherein the medium is interposed between and in contact with the second and third surfaces, the volume holograms are configured to reflect s-polarized light towards the SLM, the SLM is configured to transform the s-polarized to p-polarized light and to reflect the p-polarized light towards the grating structure, the volume holograms are configured to transmit the p-polarized light, and the polarizer is configured to transmit the p-polarized light transmitted by the volume holograms.

18. The electronic device of claim 17, further comprising:
   an additional polarizer configured to polarize the incident light prior to the incident light being incident upon the volume holograms.

19. An electronic device comprising:
   a waveguide having first and second substrates, the first substrate having a first surface and a second surface parallel to the first surface, the second substrate having a third surface and a fourth surface parallel to the third planar surface, and the third surface being parallel to the second surface;
   a spatial light modulator (SLM) having a lateral surface parallel to the fourth surface;
   a medium interposed between and in contact with the second and third surfaces, wherein the second substrate is interposed between the medium and the SLM; and
   a diffractive grating in the medium and configured to diffract incident light toward the SLM.

* * * * *